United States Patent
Buchert et al.

(10) Patent No.: US 7,428,278 B2
(45) Date of Patent: Sep. 23, 2008

(54) METHOD AND APPARATUS FOR PARALLEL MIDAMBLE CANCELLATION

(75) Inventors: Ryan Buchert, Phoenixville, PA (US); Tonino Nasuti, Norristown, PA (US); Chayil S. Timmerman, Harleysville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 984 days.

(21) Appl. No.: 10/335,359

(22) Filed: Dec. 31, 2002

(65) Prior Publication Data

US 2003/0210754 A1   Nov. 13, 2003

Related U.S. Application Data

(60) Provisional application No. 60/379,196, filed on May 9, 2002.

(51) Int. Cl.
*H04L 1/00* (2006.01)
(52) U.S. Cl. ............... 375/346; 375/348; 375/316; 375/150; 375/149; 375/130
(58) Field of Classification Search ........... 375/346, 375/348, 149, 150, 185, 131
See application file for complete search history.

(56) References Cited

U.S. PATENT DOCUMENTS

| | | | |
|---|---|---|---|
| 4,853,887 A * | 8/1989 | Jutand et al. | 708/703 |
| 4,862,098 A * | 8/1989 | Yassa et al. | 329/358 |
| 4,977,580 A | 12/1990 | McNicol | |
| 5,724,390 A | 3/1998 | Blaker et al. | |
| 5,872,801 A | 2/1999 | Mobin | |
| 5,905,757 A * | 5/1999 | Kundmann et al. | 375/229 |
| 5,923,273 A * | 7/1999 | Pastorello | 341/77 |
| 6,002,716 A | 12/1999 | Meyer et al. | |
| 6,208,285 B1 * | 3/2001 | Burkhardt | 342/132 |
| 6,339,612 B1 | 1/2002 | Stewart et al. | |
| 6,381,461 B1 | 4/2002 | Besson et al. | |
| 6,477,555 B1 * | 11/2002 | Hartung | 708/420 |
| 6,504,884 B1 | 1/2003 | Zvonar | |
| 6,523,055 B1 * | 2/2003 | Yu et al. | 708/603 |

(Continued)

FOREIGN PATENT DOCUMENTS

WO   99/52249   10/1999

OTHER PUBLICATIONS

International Application No. PCT/EP99/01973☐☐International Publication No. WO 99/52249☐☐Invention Anderson, Nicholaas, William (GB).*

(Continued)

*Primary Examiner*—Chieh M. Fan
*Assistant Examiner*—Siu M Lee
(74) *Attorney, Agent, or Firm*—Volpe and Koenig, P.C.

(57) ABSTRACT

Method and apparatus for performing midamble cancellation to remove midamble interference from the convolution tail of data field 1 and the first W-1 chips of the midamble field which results from the delay spread of the multipath channel and for canceling the first W-1 chip midamble spread in the data field 2, which operations are performed substantially simultaneously. The received burst, typically a TDD burst, is stored, the midamble interference and the corresponding parts in the received burst is removed and the resulting burst is applied to a multi-user detector to obtain the symbol sequences.

16 Claims, 9 Drawing Sheets

U.S. PATENT DOCUMENTS

| | | | |
|---|---|---|---|
| 6,584,150 B1 * | 6/2003 | Wu et al. | 375/231 |
| 6,639,551 B2 | 10/2003 | Li et al. | |
| 6,795,417 B2 * | 9/2004 | Zeira et al. | 370/335 |
| 6,816,470 B2 * | 11/2004 | Kim et al. | 370/280 |
| 6,922,716 B2 * | 7/2005 | Desai et al. | 708/524 |
| 2002/0006122 A1 * | 1/2002 | Zeira | 370/335 |
| 2002/0136177 A1 * | 9/2002 | Jechoux et al. | 370/335 |
| 2002/0163896 A1 * | 11/2002 | Hiramatsu | 370/335 |
| 2002/0181557 A1 | 12/2002 | Fuji | |
| 2002/0198915 A1 * | 12/2002 | Rainish | 708/420 |
| 2003/0153275 A1 * | 8/2003 | Oh et al. | 455/67.6 |
| 2004/0032849 A1 * | 2/2004 | Tang et al. | 370/342 |

OTHER PUBLICATIONS

International Publication No. WO 99/52249.*
WO 99/52249.*

* cited by examiner

US 7,428,278 B2

METHOD AND APPARATUS FOR PARALLEL MIDAMBLE CANCELLATION

CROSS REFERENCE TO RELATED APPLICATION

This application claims priority from U.S. provisional application No. 60/379,196 filed on May 9, 2002, which is incorporated by reference as if fully set forth.

BACKGROUND

The present invention relates to midamble cancellation. More particularly the present invention relates to method and apparatus for performing midamble cancellation utilizing an algorithm enabling parallel cancellation of midamble for both data field 1 and data field 2 of a received TDD burst.

As shown in FIG. 1, a burst is received through a multipath channel having a time-delay spread of $(W-1)*T_c$, where W represents the number of chips and $T_c$ represents chip duration. The time (delay)—spread channel causes inter-chip interference whereby the convolution tail of each field in the received burst protrudes upon the adjacent field. For example, the midamble inter-chip interference on the first W−1 chips of data field 2 may cause performance degradation of the data estimation procedure of the symbols corresponding to the first W−1 chips, unless a remedy for the interference is considered. This is especially true since the transmit power control (TPC) command (in uplink (UL) only) and transport format combination indicator (TFCI) bits are located immediately after the midamble and they are not protected by any channel coding scheme, it is desirable to eliminate midamble interference by employing a midamble cancellation procedure to improve data estimation for both data parts of the TDD burst and is a stand-alone procedure that can be used to enhance performance of any of the candidate data estimation algorithms.

Midamble cancellation (also referred to hereinafter as MDC) can also be applied to remove midamble interference from the convolution tail of Data field 1 into the first (W−1) chips of the midamble field, also shown in FIG. 1. This tail also results from the delay spread of the multipath channel and its inclusion into the data estimation of Data field 1 results in more observed data and leads to an exact block Toeplitz structure of the $A^H A$ matrix in multi-user detection (MUD).

SUMMARY

Midamble cancellation is used to remove the effect of the midamble from:

The first W−1 chips of the midamble field, allowing better modeling of the convolution tail of the first Data field protruding into the midamble field, further allowing modeling of the $A^H A$ matrix to be exactly block Toeplitz; and the first W−1 chips of Data field 2. A technique is provided for calculation of midamble interference which significantly reduces the necessary hardware as well as processing time.

BRIEF DESCRIPTION OF THE DRAWING(S)

The invention will be understood from the accompanying figures, wherein like elements are designated by like numerals and, wherein.

Figure 15:
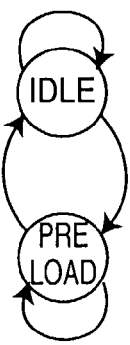
Figure 16:
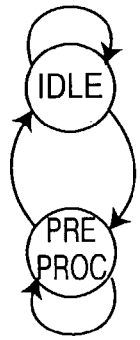

FIGS. 15 and 16 respectively show preload and preprocessor state transition diagrams.

Figure 17:
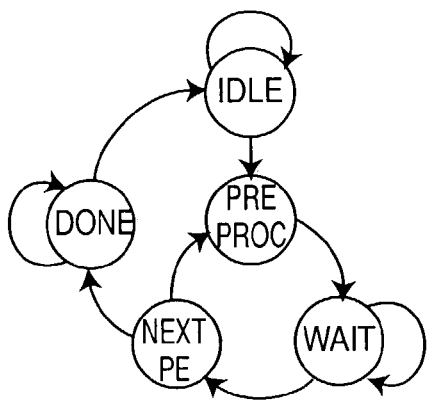

FIG. 17 is a processing element state transition diagram.

Figure 18:
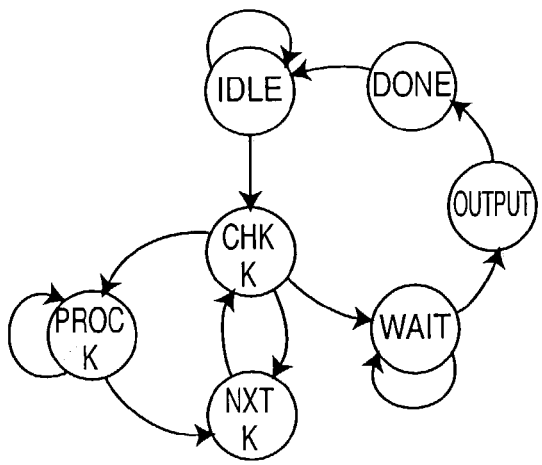

FIG. 18 is a midamble shift state transition diagram.

Figure 19:
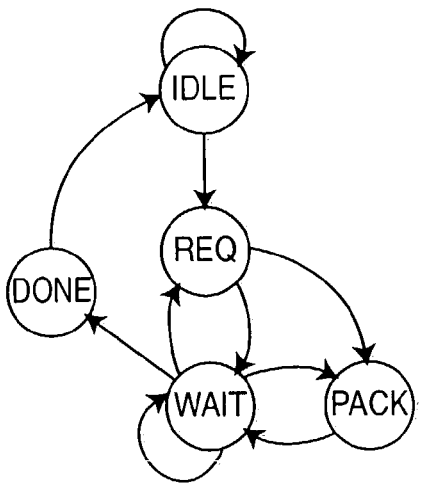

FIG. 19 is a midamble data packer state transition diagram.

Figure 20:
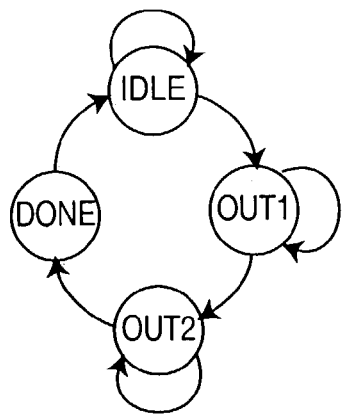

FIG. 20 is a data output state transition diagram

DETAILED DESCRIPTION OF THE PREFERRED EMBODIMENT(S)

Figure 2:
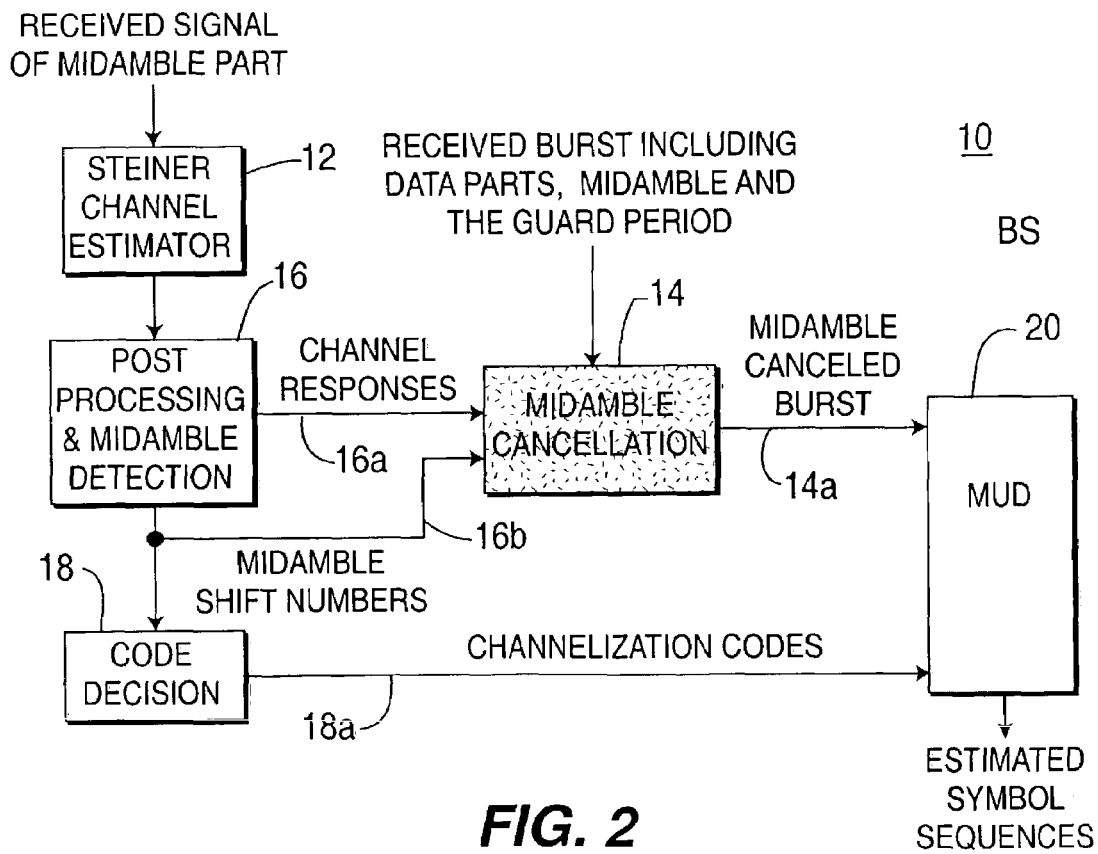
FIG. 2 is a block diagram of data demodulation circuit for a base station, (BS) including a midamble cancellation block.

FIG. 2 is a block diagram showing a data demodulation circuit 10 for demodulation of a TDD burst employed at a base station (BS). Circuit 10 includes a Steiner channel estimator 12 receiving a midamble portion of the burst. A midamble cancellation circuit 14 receives the TDD burst including data parts, midamble and the guard interval. The output of channel estimator 12 is applied to the post processing and midamble detection circuit 16 which develops channel responses at 16a, which are applied to the midamble cancellation circuit, and midamble shift numbers at 16b which are likewise applied to the midamble cancellation circuit 14.

The midamble shift numbers at 16b are also applied to code decision circuit 18 for determining channelization codes, provided at 18a, which are then applied to the multi-user detector (MUD) 20. Midamble cancellation circuit 14 utilizes the inputs described hereinabove for generating a midamble cancelled burst at 14a which is applied to the multi-user detector circuit 20.

As can clearly be seen, midamble cancellation is implemented before MUD processing. The midamble cancellation procedure initially constructs an estimate of the first W−1 chips of the midamble received in the midamble field and the first W−1 chips of the midamble spread into data field 2, respectively. The received midamble estimation is derived based on the channel responses provided by the channel estimator, 12 which utilizes a known algorithm for obtaining channel estimation, and midamble shift numbers obtained from the midamble detection block 16, which likewise uses a known algorithm to derive midamble shift numbers which, in turn, are utilized to derive channelization codes by code decision circuit 18 employing a known algorithm.

Figure 4:
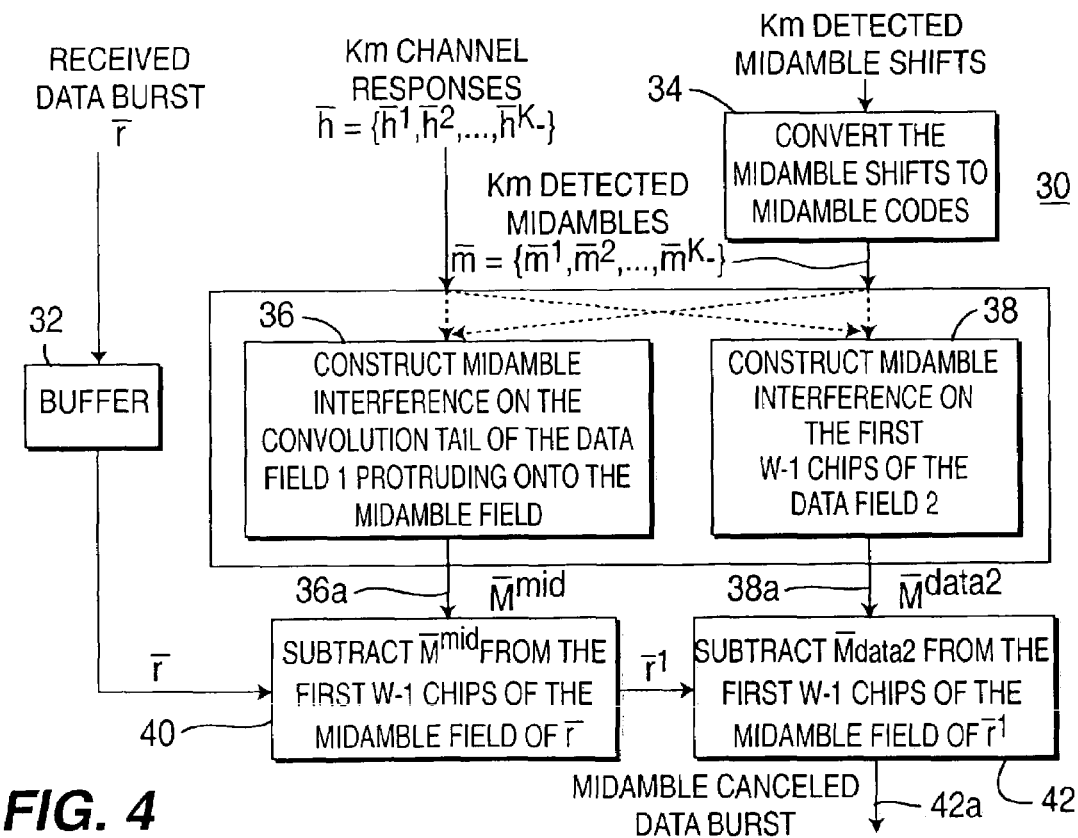
FIG. 4 is a block diagram showing a circuit for midamble cancellation utilizing the cancellation algorithm of the present invention.

The received burst is stored in a buffer 32 which cooperates with the algorithm 30 of FIG. 4, performed by the midamble cancellation circuit 14 of FIG. 2, for example. The midamble interference from corresponding parts in the received bursts is removed. The resulting burst is fed into the MUD 20 shown in FIG. 2. The concept employed for midamble cancellation is the estimation of midamble interference according to acquired midamble shift numbers and channel responses derived from detection circuit 16, whereupon the estimated interference is used to cancel the effective midamble interference from the received burst.

Midamble cancellation is applied separately to the even and odd samples of the received over-sampled sequences.

Figure 3:
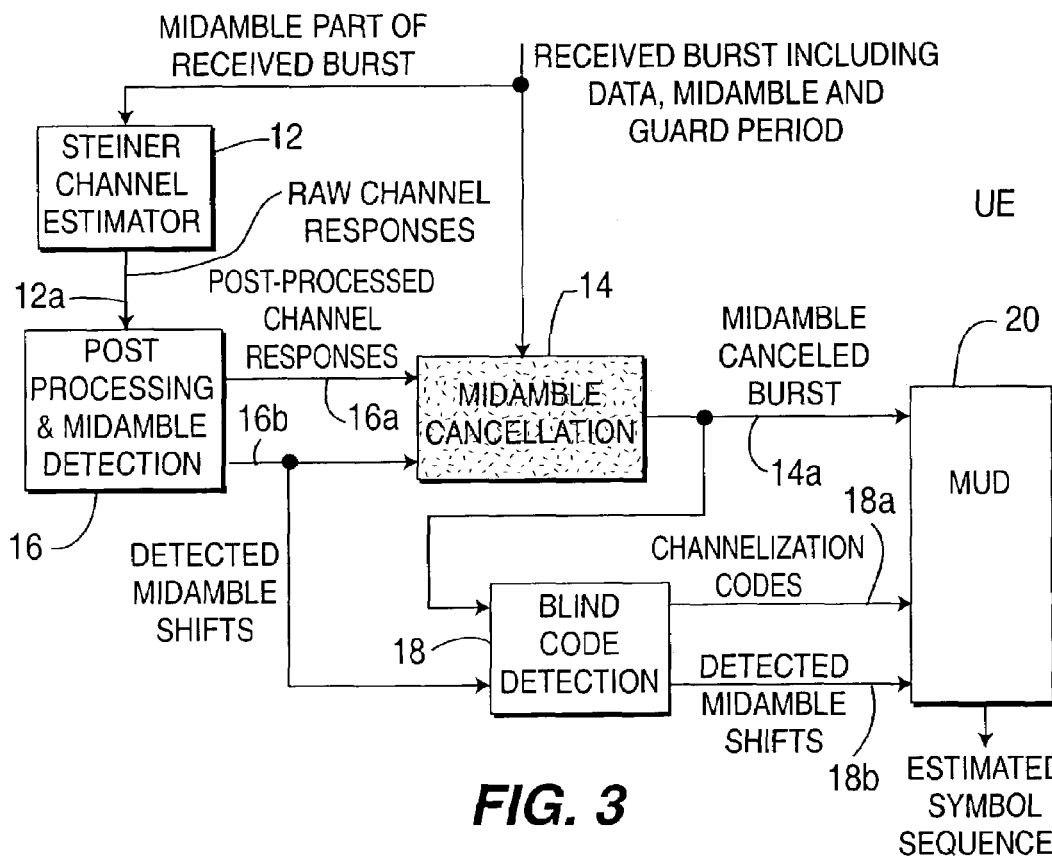
FIG. 3 is a block diagram of a data demodulation circuit for a user equipment (UE) similar to the BS circuit shown in FIG. 2.

FIG. 3 shows data demodulation circuit 11 employed by a user equipment (UE), wherein like elements as between FIGS. 2 and 3 are designated by like numerals and including the midamble cancellation block and differs from FIG. 2 in that the output 14a of cancellation circuit 14 is coupled to MUD 20 and blind code detection circuit 18, which provides detected midamble shifts 18b to MUD 20, in addition to the channelization codes.

The data employed in the cancellation circuitry of the present invention comprises:

The data inputs include a received data burst denoted by $\vec{r}$ including both data parts, the midamble and the guard period:

| Type: | vector of complex-values |
|---|---|
| Length: | 2560 chips |
| Range: | Unrestricted |

$K_m$ sets of complex channel coefficients:

$[\{\vec{h}^1, \vec{h}^2, \ldots, \vec{h}^{K_m}\}$ where $\vec{h}^i = [h_0^i, h_1^i, h_2^i, \ldots, h_{w-1}^i]]$

| Type: | vector of complex-values |
|---|---|
| Length: | $K_m \times W$ |
| Range: | Unrestricted |

$K_m$ is the number of different midambles detected by the midamble detection algorithm in the post processing and midamble detection block 16 (see FIG. 2). W is the length of each channel response.

$K_m$ midamble shift numbers: each number is used to generate a corresponding midamble code.

| Type: | vector of integers |
|---|---|
| Length: | $1 \times K_m$ |
| Range: | 1 to $K_m$ |

A microprocessor (not shown) forming part of the cancellation circuit 14 provides the association between channel impulse response and midamble shift (equivalent to midamble codes), which indicates which channel response belongs to which midamble shift (code).

The data outputs include:

Midamble cancelled data burst:

| Type: | vector of complex-values |
|---|---|
| Length: | 2560 chips |
| Range: | Unrestricted |

The parameters of the algorithm are:

Maximum midamble shift K.

Length L of each midamble code.

Burst type in use.

Length W of channel responses where W=28, 32, 57, 64 or 114 depending on the burst type and maximum midamble shift K.

Table 1 sets forth the values of the above parameters.

TABLE 1

| Parameter | Description | Burst type 1 long | Burst type 1 nominal | Burst type 1 short | Burst type 2 nominal | Burst type 2 short |
|---|---|---|---|---|---|---|
| K | Maximum midamble shift | 4 | 8 | 16 | 3 | 6 |
| W | Length of each channel response in chips | 114 | 57 | 28 or 29 | 64 | 32 |
| L | Length of each midamble code | 512 | 512 | 512 | 256 | 256 |

FIG. 4 illustrates the midamble cancellation algorithm. The received data burst is stored in a buffer memory 32, so that the midamble interference effect on data estimation for both data field 1 and data field 2 can be removed. The active midamble codes of length L in the same time slot are derived according to the input detected midamble shift numbers applied at 34. The midamble codes are derived using conventional algorithms. Then two received midamble interference sequences are constructed at 36, 38, based on $K_m$ associated pairs of the channel responses and active midamble codes. The first midamble interference corresponds to the first W−1 chip midamble received in the midamble field, which interferes with the convolution tail of the data field 1 protruding onto the midamble field, as indicated previously in FIG. 1. The received (W−1 chips) midamble sequence, $\overline{M}^{mid}$, of length W−1, appearing at 36a, can be modeled by convolving each channel response with a corresponding midamble code, such as $$\overline{M}^{mid} = \sum_{k=1}^{K_m} \overline{m}^k \otimes \overline{h}^k \quad \text{taking the first W-1 samples}$$

$$= \sum_{k=1}^{K_m} \sum_{i=0}^{W-2} m_i^k \cdot h_{n-i}^k \quad \text{for } n = 0, 1, 2 \ldots W-2$$

Equation (1)

where $m_i^k$ represents the i-th element of the midamble, $\overline{m}^k$, associated with midamble shift k. Note that $$m^{-k} = [\,[m_0^k m_1^k \ldots m_{L-1}^k]\,].$$

$\otimes$ denotes the convolution operator. In other words, the received midamble sequence is a superposition of the $K_m$ convolutions between the active midamble codes and channel responses. Equation (1) can be rewritten in a matrix form as follows:

$$\begin{bmatrix} \overbrace{m_0^1 \ 0 \ 0 \ \cdots \ \cdots \ 0}^{W} & \overbrace{m_0^2 \ 0 \ 0 \ \cdots \ \cdots \ 0}^{W} & \cdots & \overbrace{m_0^{K_m} \ 0 \ 0 \ \cdots \ \cdots \ 0}^{W} \\ m_1^1 \ m_0^1 \ 0 \ \cdots \ \cdots \ 0 & m_1^2 \ m_0^2 \ 0 \ \cdots \ \cdots \ 0 & \cdots & m_1^{K_m} \ m_0^{K_m} \ 0 \ \cdots \ \cdots \ 0 \\ m_2^1 \ m_1^1 \ m_0^1 \ 0 \ \cdots \ 0 & m_2^2 \ m_1^2 \ m_0^2 \ 0 \ \cdots \ 0 & \cdots & m_2^{K_m} \ m_1^{K_m} \ m_0^{K_m} \ 0 \ \cdots \ 0 \\ \vdots \ \ \ \vdots \ \ \ \vdots & \vdots \ \ \ \vdots \ \ \ \vdots & & \vdots \ \ \ \vdots \ \ \ \vdots \\ m_{W-2}^1 \ m_{W-3}^1 \ \cdots \ m_0^1 \ 0 & m_{W-2}^2 \ m_{W-3}^2 \ \cdots \ m_0^2 \ 0 & \cdots & m_{W-2}^{K_m} \ m_{W-3}^{K_m} \ \cdots \ m_0^{K_m} \ 0 \end{bmatrix} \times \begin{bmatrix} (\vec{h}^1)^T \\ (\vec{h}^2)^T \\ \vdots \\ (\vec{h}^{K_m})^T \end{bmatrix} = \begin{bmatrix} M_0^{mid} \\ M_1^{mid} \\ M_2^{mid} \\ \vdots \\ M_{W-2}^{mid} \end{bmatrix}$$

Equation (2)

where $$\left(\vec{h}^{-i}\right)^T$$

represents the transpose of the row channel response vector, $\overline{h}^i$, and $$\overline{M}^{mid} = [\, M_0^{mid} \ M_1^{mid} \ \cdots \ M_{W-2}^{mid} \,].$$

The matrix consists of some midamble elements for all the $K_m$ midambles in the LHS of the above equation is of size $(W-1) \cdot W \cdot K_m$. The LHS of say, the i-th row represents the sum of $K_m$ convolutions evaluated at the time instance of the i-th chip of the received midamble. The k-th partition of each row in the midamble matrix consists of that portion of $\overline{m}^k$ which contributes to the midamble interference. In addition, $[\overline{h}^1 \overline{h}^2 \ldots \overline{h}^{k_m}]^T$ is of size $K_m W \times 1$ and represents the joint channel estimate.

Figure 1:
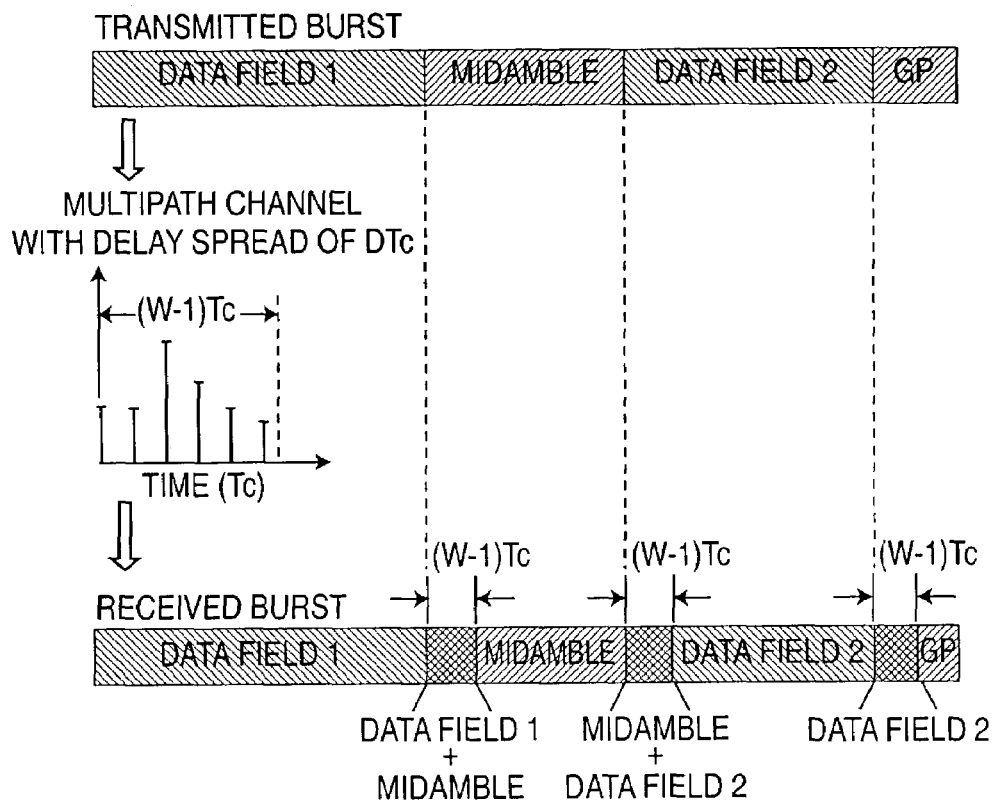
FIG. 1 shows a transmitted burst, a channel and a received burst (TDD DPCH) which is useful in explaining the need for midamble cancellation.

The second received midamble interference corresponds to the first W−1 chips of the received midamble tail into the data field 2 where the tail results from the delay spread of the channel, and it corrupts the first W−1 chips of the received data field 2 (see FIG. 1).

The procedure for constructing the midamble interference is similar to that for the data field 1 set forth above. However, in this case the convolution tail of the midamble field spreads into the data field 2. The midamble interference on the first W−1 chips of the data field 2, $$\overline{M}^{data2} = [\, M_0^{data2} \ M_1^{data2} \ \cdots \ M_{W-2}^{data2} \,]$$

can be then modeled in a matrix form as follows:

$$\begin{bmatrix} \overbrace{0 \ m_{L-1}^1 \ m_{L-2}^1 \ \cdots \ m_{L-(W-1)}^1}^{W} & \cdots & \overbrace{0 \ m_{L-1}^{K_m} \ m_{L-2}^{K_m} \ \cdots \ m_{L-(W-1)}^{K_m}}^{W} \\ 0 \ 0 \ m_{L-1}^1 \ \cdots \ m_{L-(W-1)+1}^1 & \cdots & 0 \ 0 \ m_{L-1}^{K_m} \ \cdots \ m_{L-(W-1)+1}^{K_m} \\ 0 \ 0 \ 0 \ m_{L-1}^1 \ \cdots \ m_{L-(W-1)+2}^1 & \cdots & 0 \ 0 \ 0 \ m_{L-1}^{K_m} \ \cdots \ m_{L-(W-1)+2}^{K_m} \\ \vdots \ \ \vdots \ \ \vdots & & \vdots \ \ \vdots \ \ \vdots \\ 0 \ 0 \ 0 \ \cdots \ 0 \ m_{L-1}^1 & \cdots & 0 \ 0 \ 0 \ \cdots \ 0 \ m_{L-1}^{K_m} \end{bmatrix} \times \begin{bmatrix} (\vec{h}^1)^T \\ (\vec{h}^2)^T \\ \vdots \\ (\vec{h}^{K_m})^T \end{bmatrix} = \begin{bmatrix} M_0^{data2} \\ M_1^{data2} \\ M_2^{data2} \\ \vdots \\ M_{W-2}^{data2} \end{bmatrix}$$

Equation (3)

After modeling the two midamble interference sequences by Equations (2) and (3), respectively, Equation (2) is cancelled from the first W−1 chips of the midamble field in the received stored data burst, r̄, at 40, where, in the absence of noise, each of the first W−1 chips consists of the corresponding midamble chips and the convolution tail of the data field 1, as seen in FIG. 1. Next the midamble interference effect on the data field 2 is removed, at 42, by subtracting Equation (3) from the first W−1 chips of the data field 2 in r̄. The resulting data burst is then considered as being a burst in which data estimation is not affected by the midamble interference.

The output, at 42a, is applied to MUD 20, see FIG. 2, together with the output at 18a, to derive the estimated symbol sequences, appearing at output 20a.

The performance of the technique of the present invention is dependent on the accuracy of the channel estimation and midamble detection algorithm. With perfectly known channel responses, the implementation should result in less than 0.1 dB degradation in resultant signal-to noise ratio.

Since the midamble cancellation processing (circuit 14—FIG. 3) is completed before data demodulation (with MUD circuit 20), the processing time of midamble cancellation directly affects MUD related latency. Taking into account transmit power control (TPC) latency and especially latency in extracting raw TPC bits, latency of midamble cancellation processing should be less than 80≈0.03 timeslot.

Figure 5:
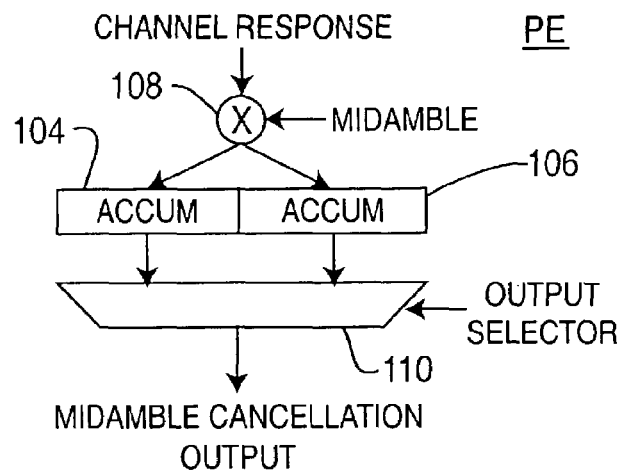
FIG. 5 is a simplified block diagram of a midamble cancellation engine.

Processing element (PE) adders perform a "multiplication" of midambles and channel responses as shown by "multiplier" 108 in FIG. 5. Each PE is provided with storage registers (i.e. accumulators) 104, 106 for each cancellation vector. Multiplexer, 110 selects the proper midamble output cancellation as will be more fully explained herein.

Figure 7:
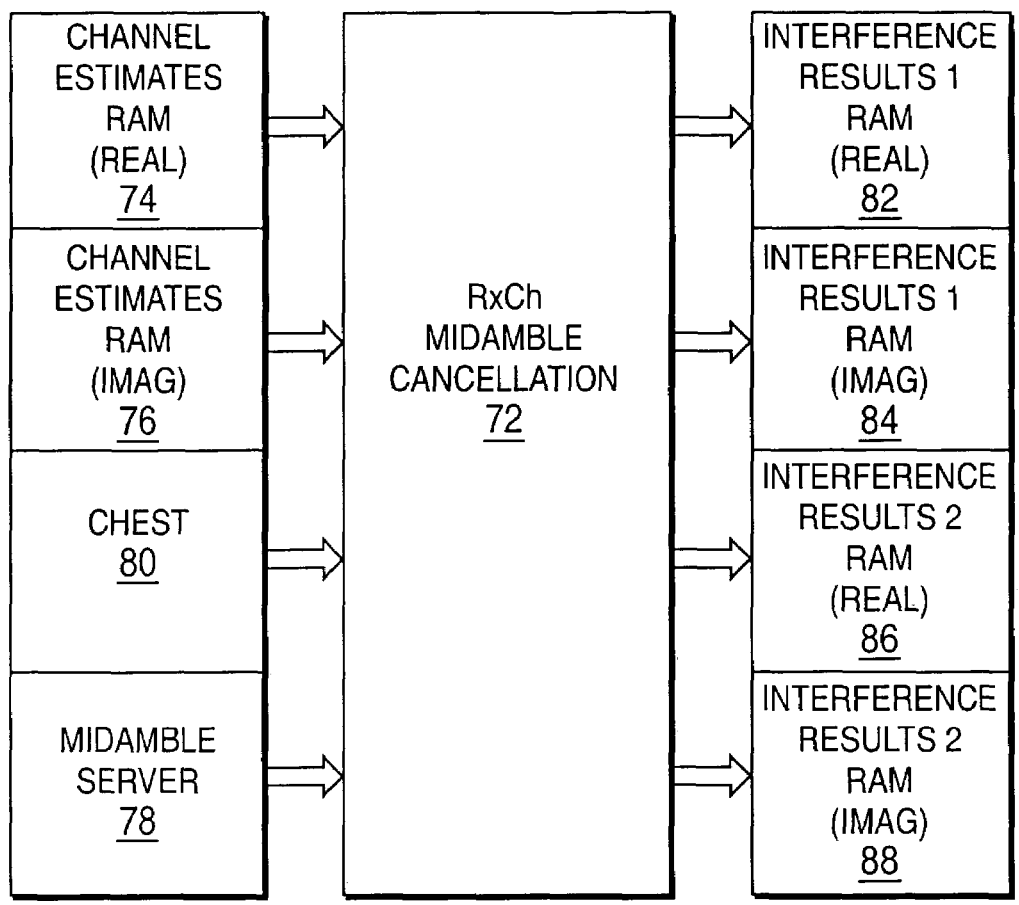
FIG. 7 is a block diagram showing how the midamble cancellation block interfaces with other circuits of the system.

The following is a high-level description of the system design. FIG. 7 illustrates how the midamble cancellation block 72 interfaces with the other components of the system 70. During processing, the midamble cancellation block 72 has full access to the channel estimates RAMs 74, 76 without contention from other processes. The channel estimates consist of 16-bit complex values with real and imaginary components separated into 2 RAMs, 74, 76.

The midamble server 78 supplies 16-bit midamble sequences based on the midamble number and midamble shift. Each sequence corresponds to 16 1-bit values.

Channel Estimation (CHEST) 80 supplies configuration parameters that control the functionality of midamble cancellation. Also, CHEST supplies control signals that initiate midamble cancellation processing.

The computed interference sequences are stored into 2 pairs of RAMs 82-84 and 86-88. Each pair consists of a real component 82, 86 and an imaginary component 84, 88. One pair is for the data field 1 interference results and the second pair is for the data field 2 interference results.

From Equation 2 and Equation 3, set forth above, we can see that the processing consists of a large matrix multiplication. The size of the left-hand matrix is (W−1)×W*Km. The size of the right-hand vector is W*Km×1. The total number of multiplies is (W−1)*W*Km. Since the size of each midamble sample is 1 bit, the implementation of the multipliers can be simplified and implemented by a mux.

Based on Table 1, the worst-case number of multiplies occurs when W=57 and Km=8, resulting in a total of 25,536 multiplies. Performing these multiplies sequentially is unacceptable since the total number of clock cycles equals the number of multiplies. Instead, it is necessary to perform the multiplications for multiple rows in parallel by assigning a processing element (PE) to each row. The PE for each row can be conveniently implemented using a multiply and accumulate function. The total processing time then will be (W−1)*W*Km/NPE, where NPE is the number of PE's.

The greatest savings in processing time are achieved when NPE=the number of rows=(W−1). The worst case processing time, in this case, is W*Km. This occurs when W=29 and Km=16 and results in 464 cycles. If the processing time requirement permits it, the number of PE's could be made less than the total number of rows. The PE's could be allocated to a set of rows for part of the processing time and then reallocated to a different set of rows for the next part of the overall processing.

Figure 8:
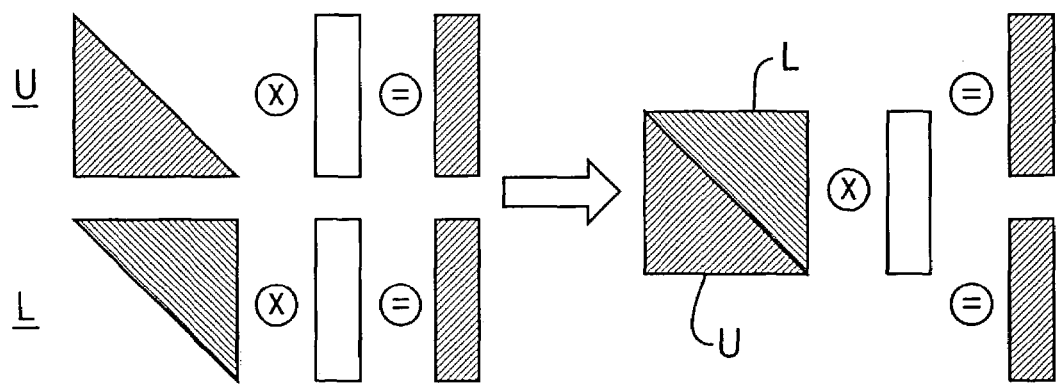
FIG. 8 is a graphical representation of the manner in which processing of midamble sequences of the data fields are combined.

The approach set forth above assumes each of the equations (2) and (3) are processed separately and that the hardware will need to be duplicated for each of the equations. From Equation 2 and Equation 3 we see that the first multiplicand matrix is upper-triangular while the second matrix is lower triangular. We can combine the two matrices into a single matrix since there is no overlap between the two of them. This allows the processing of the two equations to be combined into one hardware process. FIG. 8 is a graphical representation of the combined processing.

The additional hardware consists of two (2) accumulators in each PE instead of 1, along with the associated control logic. Note that each PE performs a multiply and accumulate across a given row sequentially. Therefore, during any given clock cycle, only one of the two accumulators will be active and it will accumulate the results for either the upper triangular matrix multiply or for the lower one. By the end of a row, both accumulators have the results for both of the matrix multiplies.

The amount of hardware required to implement this function is directly related to the amount of time available for processing and to the bit widths used for the computations. Since the processing time and bit width requirements need not be firm, the design herein was chosen to be parameterized.

The parameterization occurs in two different aspects. First, the bit widths are parameterized allowing easy scaling of the design. Second, the amount of hardware used in parallel is also a parameter. The design is based on a basic processing element referred to as a PE. The number of required PE's depends on how parallel the design needs to be. Therefore, the number of PE's in the design is parameterized.

Figure 9:
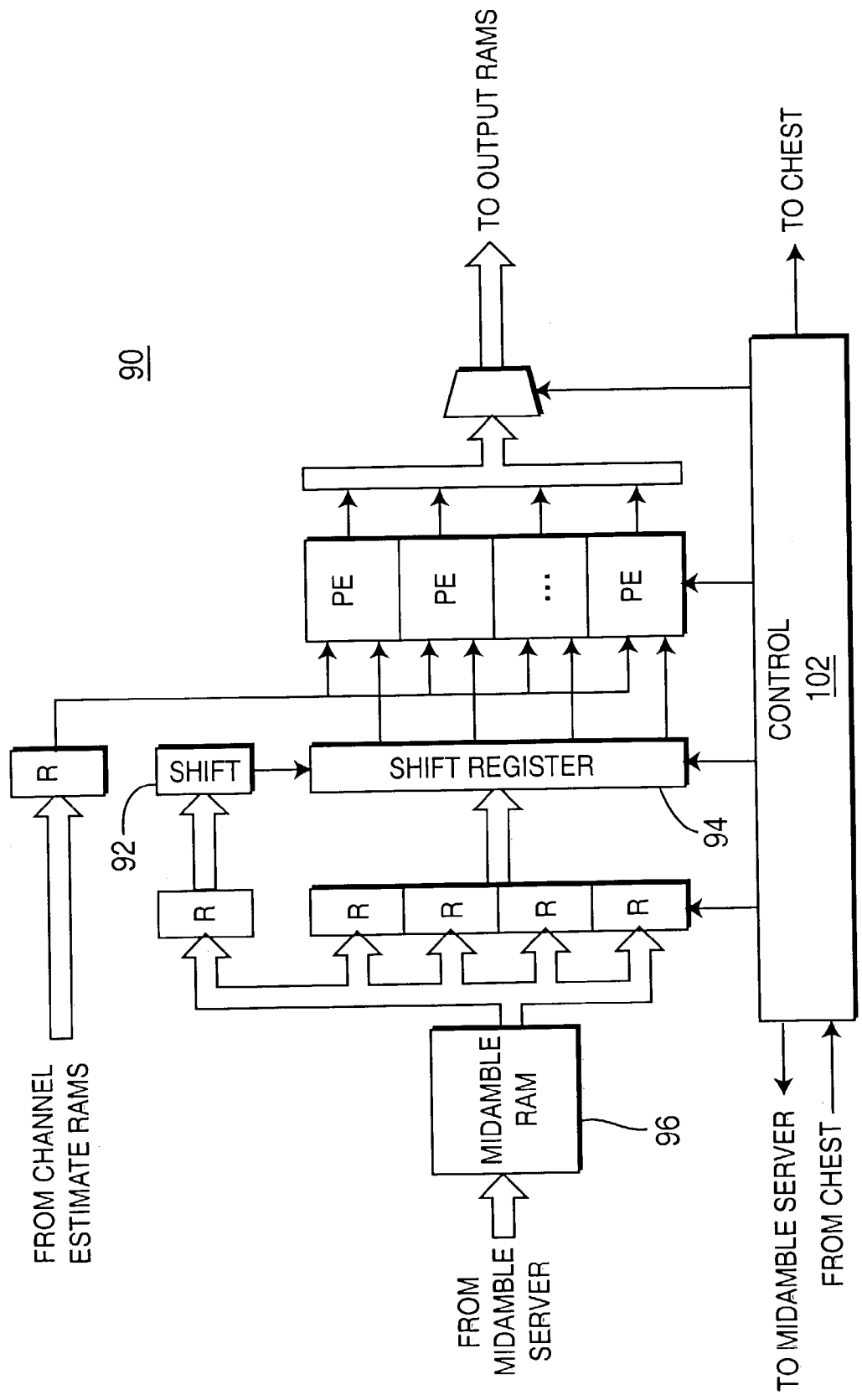
FIG. 9 is a block diagram of a midamble cancellation device embodying the principles of the present invention.

Note from the Equation 2 and Equation 3 that column i+1 in the matrices, is equal to column i shifted down by 1 row. This allows a simple architecture that uses a shift register 94 (see FIG. 9) to control the flow of the midamble data into the PE's. FIG. 9 is a block diagram of the midamble cancellation design.

In FIG. 9, there are 2 shift registers, an upper one 92 and a lower one 94. The lower shift register 94 supplies midamble data to each of the processing elements PE. The upper shift register supplies data to be shifted into the lower register 94. Timing and control is exerted by control circuit 102.

At the start of processing, the lower register 94 contains all of the data needed for the data field 1 calculation (lower triangular matrix—see FIG. 8). The upper register progressively supplies data for the data field 2 calculation (upper triangular matrix). At the completion of the processing, the lower shift register 94 contains all of the data needed for data field 2.

The size of the upper shift register 92 is fixed at 16 bits. The size of the lower shift register 94 is equal to the number of PE's and is therefore parameterized. The parameter can take on multiples of 16-bits. Each stage of the shift register contains one binary bit (0 or 1) which respectively control subtraction and addition operations.

Each shift register has a set of queue registers R that allow processing to be pipelined. The queue registers R are loaded with data from the next active midamble shift, by RAM 96 while the PEs process data stored in the working shift register 94 from the current midamble shift.

Note that data retrieved from the midamble RAM 96 is packed into 16-bit words before being stored into the shift registers 92,94.

As set forth above, FIG. 5 is a simplified, high-level diagram of a PE in the midamble cancellation design. Note that there are two accumulators 104,106 however, some hardware is shared between the two processes. The PE "multiplies" the channel response vector by a midamble row at 108. The output selector controls the multiplexer 110 to select the contents of one of the accumulators 104, 106.

Since both the channel estimates and the midamble bits are complex-valued samples, the PEs need to perform complex arithmetic. However, a full multiplier is not necessary since the midamble value consists of a single bit.

According to 3GPP TS 25.221: $\underline{m}_i = (j)^i * m_i$ for all i=1, . . . , P Therefore, the midamble sample represents 1 of 4 possible values:

1+0j
0+1j
−1+0j
0−1j

The channel estimate consists of a multi-bit complex value A+Bj.

Therefore, multiplying the channel responses by the midamble samples results in 1 of 4 possible outputs:

(A+Bj)(1+0j)=A+Bj
(A+Bj)(0+1j)=−B+Aj
(A+Bj)(−1+0j)=−A−Bj
(A+Bj)(0−1j)=B−Aj

Figure 6:
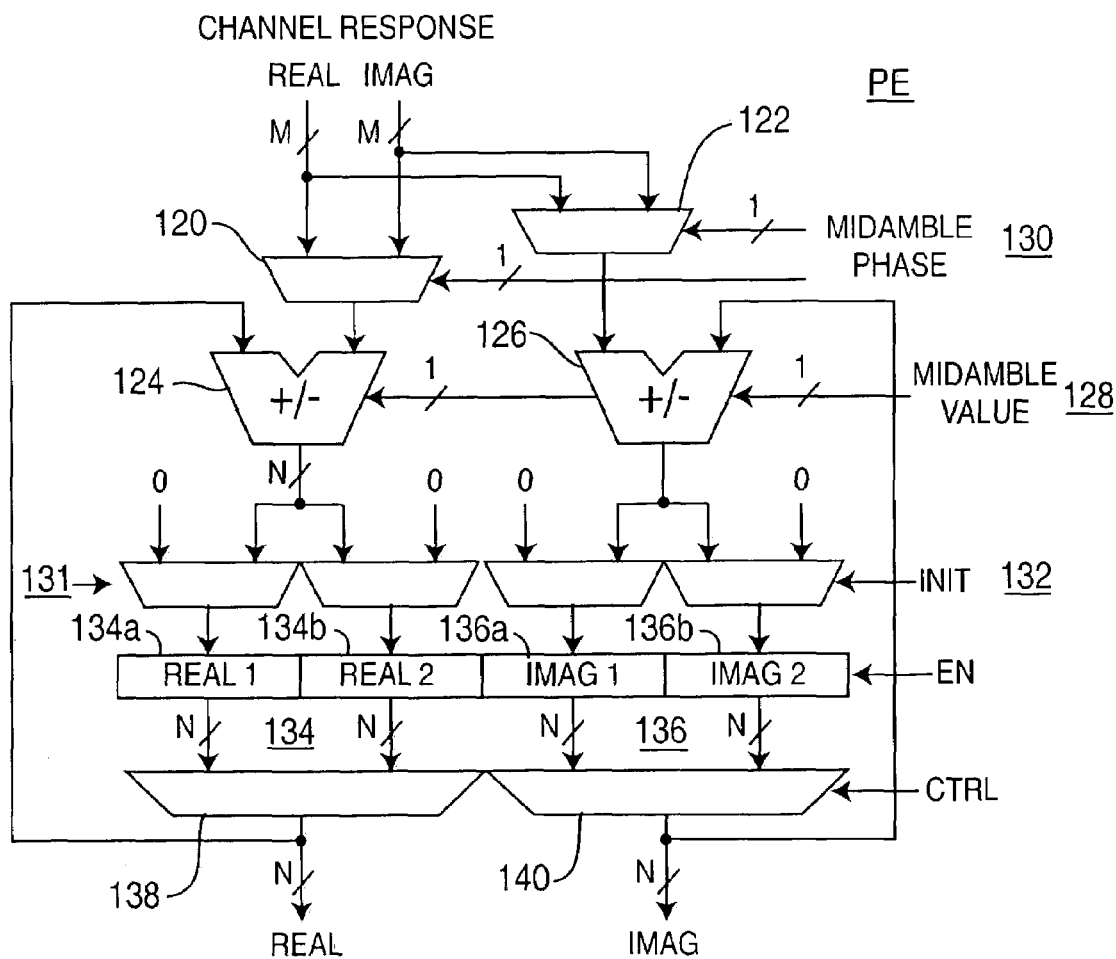
FIG. 6 is a block diagram showing one of the processing elements of FIG. 5 in greater detail.

From this we see that multiplication can be implemented with a pair of muxes (multiplexers) 120, 122 and a pair of adders/subtractors 124, 126, as shown in FIG. 6. The midamble bit value $m_i$ at 128 controls the sign of the input (i.e. whether the samples get added or subtracted). The 2-bit phase at 130 controls how the inputs are muxed into the PE. The PE is initialized at 132, loading zeros into the accumulators 134, 136 through the multiplexers 131 each accumulating a real part REAL 1 and REAL 2 at 134a and 134b and an imaginary part Imag. 1 and Imag. 2 at 136a and 136b for each of the interference values, as shown at 36 and 38 in FIG. 4. Multiplexers 138 and 140 respectively select one of the values Real 1, REAL 2 and Imag. 1 and Imag. 2. Each value at the outputs of muxes 138, 140 is returned to the adder subtractors 124, 126 for the next addition/subtraction operation.

Figure 10:
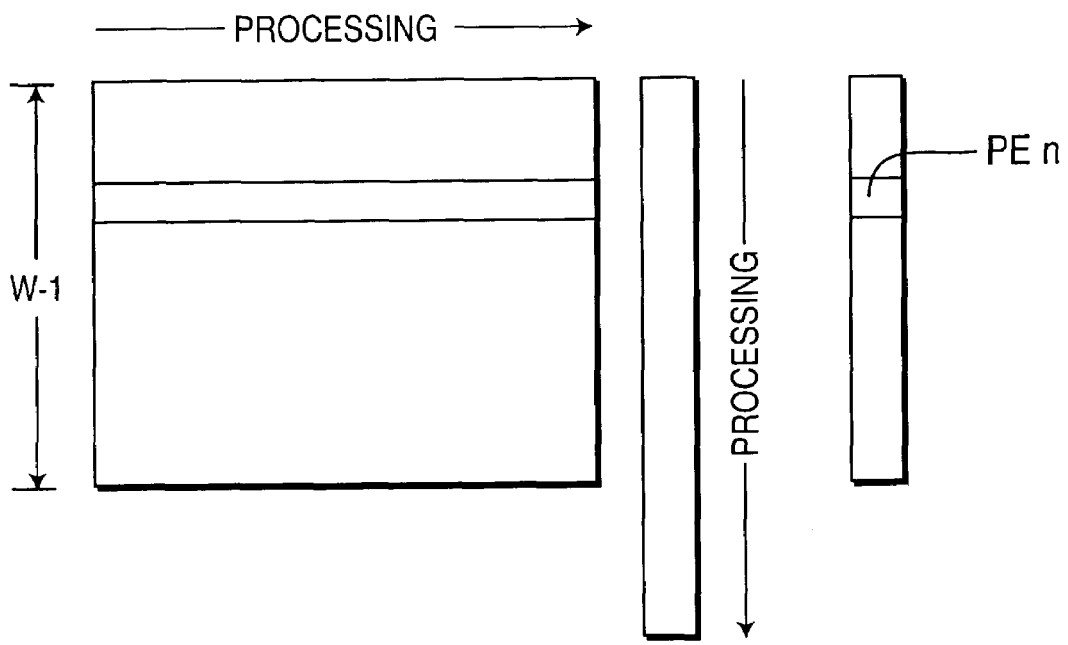
FIG. 10 is an illustration useful in explaining a processing element calculation.
Figure 11:
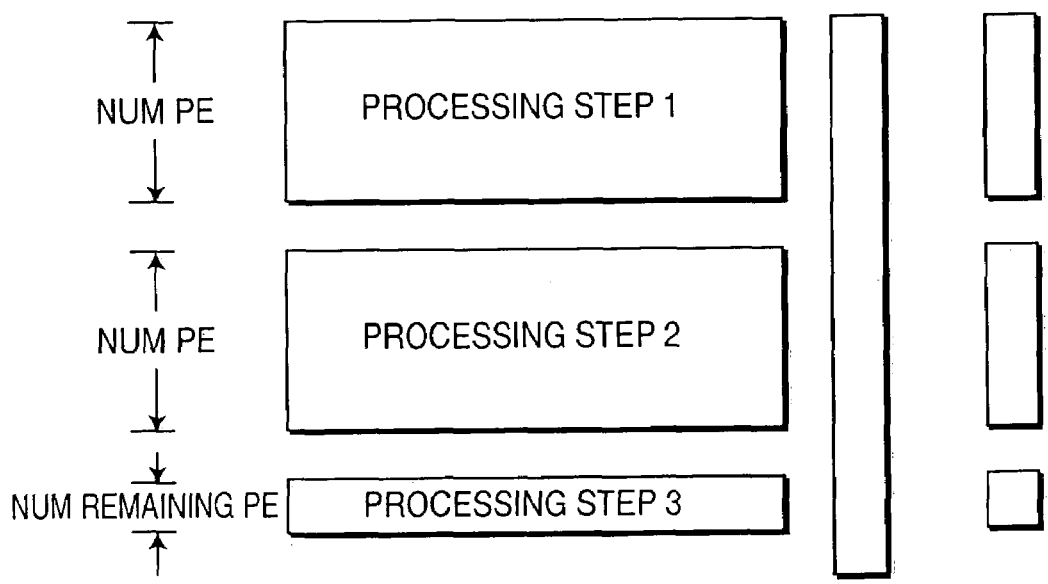
FIG. 11 is an illustration useful in explaining how a processing breakdown can be managed.

FIG. 10 graphically shows the matrix multiplication process and illustrates the role of a processing element in the midamble cancellation design. Each PE is assigned to a given row. It should be noted that each row contains data from both the lower-triangular and the upper triangular portions of the equations above. Therefore, the accumulators of each PE respectively contain data field 1 and data field 2 interference values at the end of the processing cycle for each row.

From a consideration of FIG. 8 it can be seen that a PE for the first row of the upper matrix U does not provide an output at that PE for the midamble associated with the left-hand-most column whereas there is an output at that PE for the left-hand most column of the first row of the lower matrix L. The PE assigned to the first row provides an output for all of the remaining columns for the lower matrix L and no outputs for the upper matrix U.

The pattern is repeated for each subsequent row wherein one more column position for each row yields an output for matrix U and one less column position yields an output for matrix L until, at the last row, there are no outputs for matrix L and all columns of the last row yield an output for matrix U.

Figure 13:
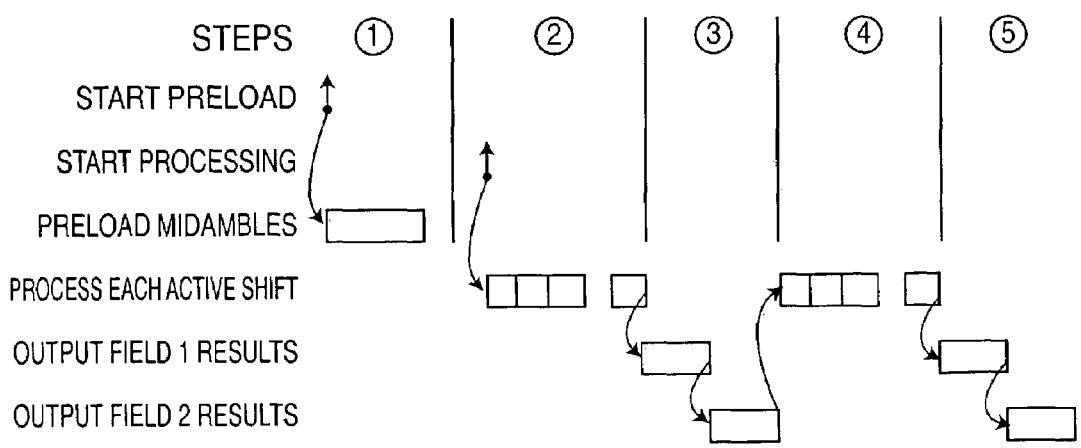
FIG. 13 is a simplified diagram showing the midamble cancellation processing timeline.

For a given implementation of the MDC, the number of PE's may be less than the number of required calculations. In this case, the total number of rows is subdivided into sections whose size is the number of PE's. This is illustrated in FIG. 13. At the end of each processing step, the output data must be written out before the next process step begins. The processing step is repeated until all data has been processed. Note that the last processing steps may utilize less than the total number of PE's.

Table 2 shows the combined midamble matrix derived from combining Equation 2 and Equation 3 for a given midamble shift.

TABLE 2

| | Combined Midamble Matrix | | | | | | |
|---|---|---|---|---|---|---|---|
| | 0 | 1 | 2 | ... | W − 3 | W − 2 | W − 1 |
| 0 | 0 | L − 1 | L − 2 | ... | L − (W − 3) | L − (W − 2) | L − (W − 1) |
| 1 | 1 | 0 | L − 1 | L − 2 | ... | L − (W − 3) | L − (W − 2) |
| ... | ... | 1 | 0 | L − 1 | L − 2 | ... | L − (W − 3) |
| W − 4 | W − 4 | ... | 1 | 0 | L − 1 | L − 2 | ... |
| W − 3 | W − 3 | W − 4 | ... | 1 | 0 | L − 1 | L − 2 |
| W − 2 | W − 2 | W − 3 | W − 4 | ... | 1 | 0 | L − 1 |

Note that the total number of midamble elements required for a given midamble shift consists of 0 to W−2 and L−(W−1) to L−1. Note also that since the midamble is repetitive, L−1 and 0 are contiguous. Therefore, the total elements required consist of a contiguous list from L−(W−1) to W−2. When a subset of the total rows is processed due to a limited number of PE's, the list of required elements remains contiguous since only the start and end points are altered. Therefore, retrieving midamble samples can be simplified by establishing a start point and sequentially retrieving data until all the required data has been retrieved. This simplifies the midamble packer control logic.

In reality, midamble cancellation establishes the end point and retrieves samples in reverse order. This is because the lower triangular matrix is processed first.

Note that the indices listed above are all relative to the basic midamble offsets for a particular midamble shift. The absolute midamble indices are discussed below.

Figure 12:
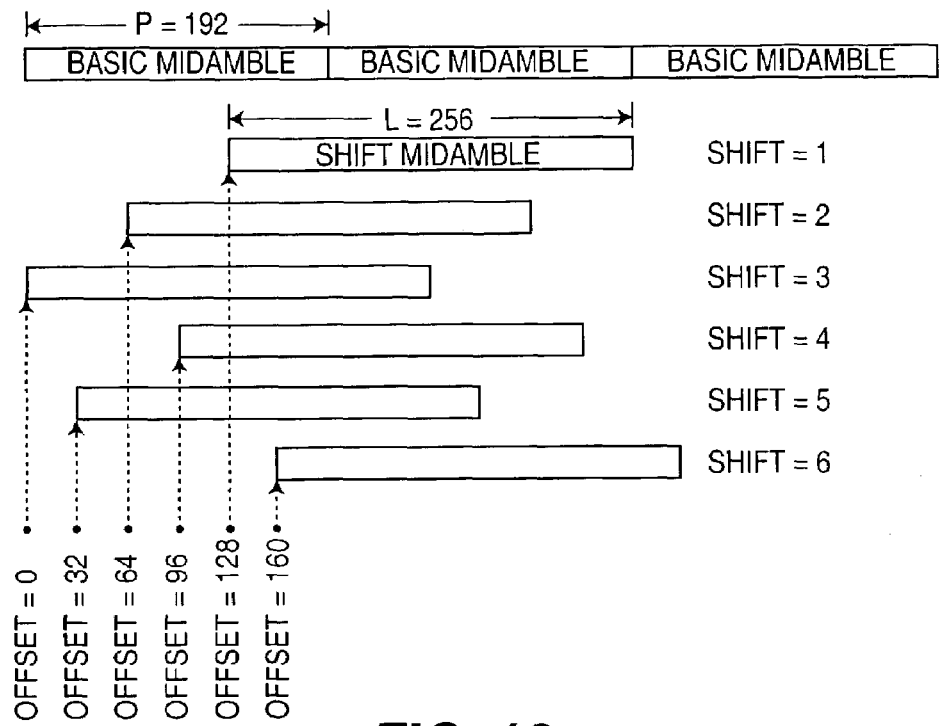
FIG. 12 is an illustration useful in explaining the manner in which midamble shifts of Burst Type 2 are performed.

FIG. 12 shows an example of how midamble cancellation calculates a midamble sample for burst type 2. As stated above, MDC requests an entire basic midamble sequence (of length P) from the midamble server at the start of processing and stores it in a local RAM. A specific user's midamble consists of L samples of a cyclically shifted version of the basic midamble.

MDC creates a shifted midamble sequence by addressing the midamble RAM in a circular fashion. The starting point is based on the midamble shift number.

Table 3 lists the equations from two (2) different versions of third generation (3G) specifications that define how to generate the initial midamble offsets based on the basic midamble. Both versions are shown as a reference, depending on what version is used for Spin 1 of the design. Table 4 and Table 5 list the initial offset values calculated from the corresponding equations for both long and short midamble, respectively.

TABLE 3

Equations to Calculate Midamble Shifts

From TS 25.221
v3.3.0

| | |
|---|---|
| Eq. 1 (K' − k)W | k = 1 to K' |
| Eq. 2 (K − k)W + floor(P/K) | k = K' + 1 to K |

From TS 25.221
v4.1.0

| | |
|---|---|
| Eq. 1 (K' − k)W | k = 1 to K' |
| Eq. 2 (K − k − 1)W + floor(P/K) | k = K' + 1 to K − 1 |
| Eq. 3 (K' − 1)W + floor(P/K) | k = K |

TABLE 4

Initial Midamble Offsets for Long Midambles
assumes: K' = 8, K = 16, W = 57, P = 456, L = 512

| k | v3.3.0 | v4.1.0 |
|---|--------|--------|
| 1 | 399 | 399 |
| 2 | 342 | 342 |
| 3 | 285 | 285 |
| 4 | 228 | 228 |
| 5 | 171 | 171 |
| 6 | 114 | 114 |
| 7 | 57 | 57 |
| 8 | 0 | 0 |
| 9 | 427 | 370 |
| 10 | 370 | 313 |
| 11 | 313 | 256 |
| 12 | 256 | 199 |
| 13 | 199 | 142 |
| 14 | 142 | 85 |
| 15 | 85 | 28 |
| 16 | 28 | 427 |

TABLE 5

Initial Midamble Offsets for Short Midambles
assumes: K' = 3, K = 6, W = 64, P = 192, L = 256

| k | v3.3.0 | v4.1.0 |
|---|--------|--------|
| 1 | 128 | 128 |
| 2 | 64 | 64 |
| 3 | 0 | 0 |
| 4 | 160 | 96 |
| 5 | 96 | 32 |
| 6 | 32 | 160 |

FIG. 13 illustrates the processing timeline that corresponds to the block diagram.

Step 1: At the beginning of Steiner processing, CHEST kicks off the midamble cancellation preload process. During this process, midamble cancellation requests the entire basic midamble sequence from the midamble server and stores it into a local RAM.

Step 2: After post-processing is complete, CHEST kicks off midamble cancellation main processing this process, midamble cancellation retrieves midamble samples and channel responses for each active midamble shift.

Step 3: At the end of processing, each PE contains 2 accumulators full of data. The first accumulator from each PE (corresponding to data field 1 results) is sequentially muxed out and stored into RAMs (See RAM 82 and 84—FIG. 7).

Next, the second accumulator (data field 2 results) from each processing element is muxed out sequentially and stored (RAMs 86 and 88).

Steps 4, 5: If the number of processing elements is less than W−1, steps 2 and 3 are repeated until all of the required processing is complete.

The following is a description of the processing flow and the finite state machines that control various processes within the midamble cancellation function.

Figure 14:
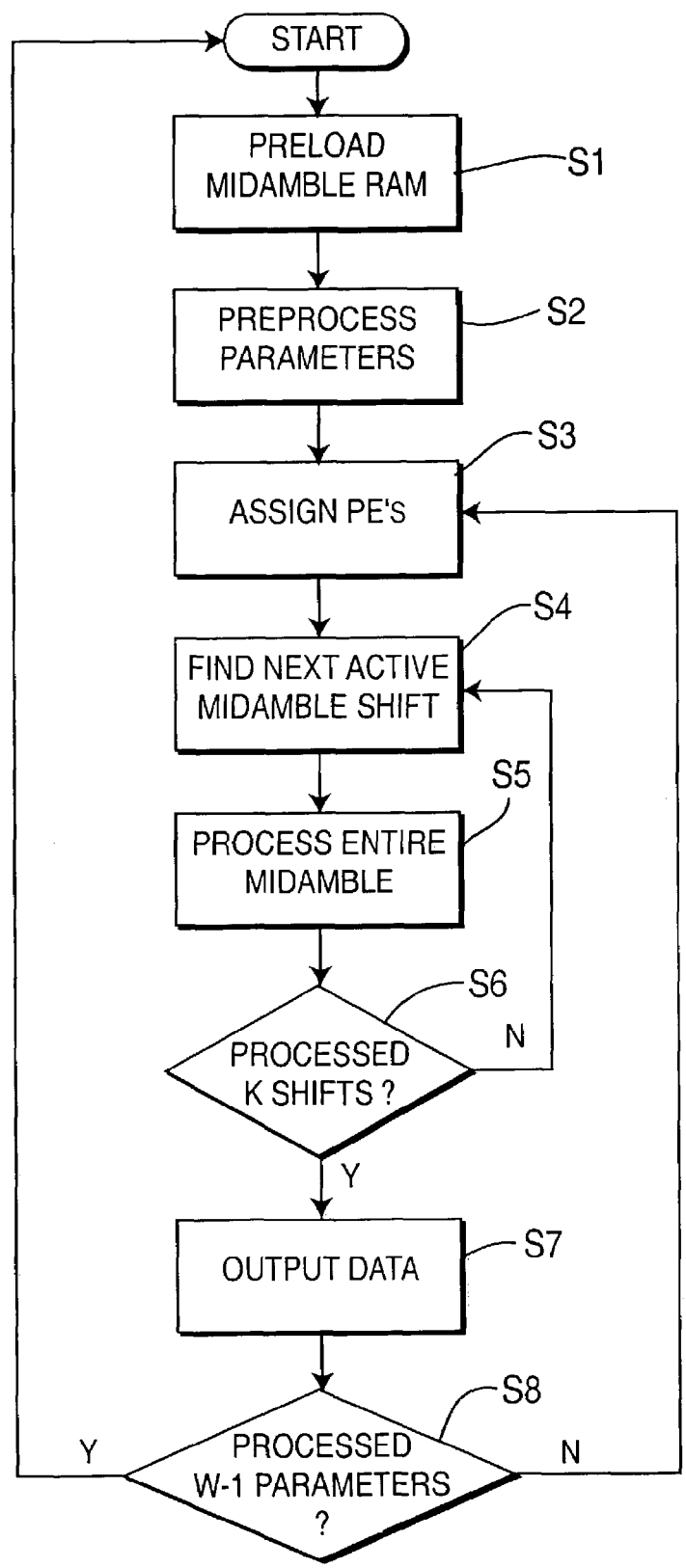
FIG. 14 is a simplified flow diagram of the midamble cancellation process.

FIG. 14 illustrates the processing that takes place for the midamble cancellation function. This is similar to the processing timeline shown in FIG. 13, but breaks down the control processes required.

There are two (2) control signals that start MDC processing. The first signal starts the MDC preload process (S1). The second control signal kicks off the MDC main processing (S2).

The available processing elements (PEs) are each assigned to process one row of the matrix multiplication (S3). If the total number of PE's is less than the total number of rows (W−1), then the PE's will be assigned to a first set of rows. Once processing is complete for this set of rows, the PE's will be reassigned to the next set of rows. This is repeated until all of the rows have been processed.

The next step is to loop through each midamble shift in order to look for an active midamble (S4). When an active shift is found, the matrix multiplication continues (S5).

The multiplication continues for the entire midamble sequence for the current shift. This continues until all midamble shifts have been processed. Once all of the active midamble shifts have been processed (S6), data is available for both data field 1 and data field 2 (S7). The data is sequentially output and written into the output RAMs.

The entire process is repeated until all W−1 rows are processed (S8).

The state machines, shown in FIGS. 15 through 20, control the processes depicted in the flowchart of FIG. 16.

The preload state machine, FIG. 15, requests the current midamble number from the midamble server and stores the data into a local RAM. The process is complete when the entire sequence is stored.

The preprocessor, FIG. 16, sequences through the active midamble parameter in order to count up the total number of active midambles that need to be processed.

The processing element state machine, FIG. 17, keeps track of the number of rows that have been processed and which PE's are assigned to each row. This state machine continues processing until all rows of the midamble cancellation matrix have been processed.

The midamble shift state machine, FIG. 18, sequences through each midamble shift in order to process each active shift. As the shift number is incremented, this state machine checks whether the current shift is active or not. If the midamble shift is active, the data packer state machine is kicked off in order to retrieve the midamble data. Once all of the midamble shifts have been processed, this state machine kicks off the data output state machine.

The midamble data packer state machine, FIG. 19, is responsible for retrieving midamble data from the local RAM and packing it into 16-bit words. The order in which the data is retrieved from RAM is based on the current midamble shift.

The data output state machine, FIG. 20, is responsible for writing the midamble cancellation output data sequentially into RAM. All of the data field 1 results are written first. The data field 2 results are written next.

The internal bit widths were chosen to accommodate the following maximum parameters:
maximum number of PE's=64
maximum W=114

TABLE 6

Table of Processing Times for Various Parameters

| NPEs | K = 4<br>W = 114 | K = 8<br>W = 57 | K = 16<br>W = 29 | K = 3<br>W = 64 | K = 6<br>W = 32 |
|---|---|---|---|---|---|
| 16 | 4427 | 2221 | 1135 | 1013 | 511 |
| 32 | 2380 | 1181 | 610 | 578 | 295 |
| 48 | 1887 | 1205 | 610 | 581 | 295 |
| 64 | 1397 | 715 | 610 | 365 | 295 |

Table 6 lists the number of clock cycles required to perform midamble cancellation for the given parameters. The measurements were taken from the start of processing, excluding the midamble preload from the midamble server.

What is claimed is:

1. A method for parallel midamble cancellation in a received Time Division Duplex (TDD) burst, having first and second data fields separated by a midamble field, for canceling the effect of midamble interference on the second data field of the received burst, comprising:
   a) storing the received burst;
   b) determining a channel estimation from a midamble portion of the received burst;
   c) utilizing the channel estimation for obtaining channel responses and midamble shift numbers;
   d) converting the midamble shift numbers to midamble codes;
   e) constructing a first midamble interference sequence based on associated pairs of said channel responses and midamble codes to provide a first midamble interference corresponding to a given number of chips of a tail of the received midamble field into the second data field and subtracting the first midamble interference from the second data field of the data burst for canceling the effect of midamble interference on the second data field.

2. The method of claim 1, further comprising:
   f) constructing a second midamble interference sequence based on associated pairs of said channel responses and midamble codes to provide a second midamble interference corresponding to a given portion of the midamble field which interferes with the convolution tail of the first data field protruding onto the midamble field and subtracting the second midamble interference from the given portion of the midamble for canceling the effect of the convolution tail of the first data field upon the midamble field.

3. The method of claim 2 wherein the second and the first midamble interference obtained in steps (f) and (e) are consecutively subtracted from a received data burst which is temporarily stored during the performance of step (a).

4. A method for midamble cancellation in a received Time Division Duplex (TDD) burst having data fields separated by a midamble, comprising:
   a) storing a midamble in a multi-stage shift register having an input stage and an output stage;
   b) respectively applying real and imaginary parts of the output stage of the register to a first and a second multiplexer, whereby each multiplexer combines the midamble contents at the output stage with a channel response;
   c) respectively transferring the outputs of the first and second multiplexers to first and second accumulators;
   d) advancing contents of a next stage of said register to said output stage;
   e) repeating steps (b), (c) and (d); and
   f) respectively combining contents of the first and second accumulators with the outputs of the first and second multiplexers.

5. The method of claim 4 wherein steps (b) through (f) are repeated until the midamble initially placed in the input stage has reached a given stage.

6. The method of claim 4 wherein the real and imaginary parts of the accumulator are subtracted from a given number of chips of a midamble field of a data burst.

7. The method of claim 4 wherein the real and imaginary parts of the accumulator are subtracted from a given number of chips of a data field of a data burst.

8. Apparatus for midamble cancellation in a received Time Division Duplex (TDD) burst, having first and second data fields separated by a midamble field containing a midamble, for canceling the effect of midamble interference on the TDD burst, comprising:
   a storing device for storing the received burst;
   a unit for transferring the midamble into a multi-stage shift register;
   a unit for applying real and imaginary contents at each stage of the register to an associated multiplexer pair, each pair comprising first and second multiplexers, whereby the first and second multiplexer of each multiplexer pair respectively combines the real and imaginary contents of each stage with a channel response applied to the first and second multiplexers of said pairs of multiplexers; and
   a unit associated with each stage of said register for separately accumulating the outputs of the first and second multiplexers of an associated multiplexer pair in first and second accumulators.

9. The apparatus of claim 8 further comprising:
   a shifting circuit for shifting the contents of each stage in a given direction to advance the content of each upstream stage to a multiplier associated with the next downstream stage.

10. The apparatus of claim 8 further comprising:
    first and second adder/subtractors each associated with a multiplexer pair for respectively adding outputs of each pair of multiplexers to the contents of the associated first and second accumulators when a midamble value associated with each of the first and second adder/subtractors is a first binary state and subtracting outputs of each pair of multiplexers from the contents of the associated first and second accumulators when a the midamble value is a second binary state.

11. The apparatus of claim 10 further comprising a device for initializing the first and second accumulators responsive to initiation of a cancellation operation.

12. Apparatus for canceling midamble interference from a received data burst comprising of first and second data fields and a multi-bit midamble, said apparatus comprising:
    a plurality of processing elements (PEs);
    a circuit for obtaining channel responses and a midamble from the date burst;
    a circuit for coupling the channel responses to each PE;
    a circuit for successively coupling each bit of said midamble to each PE;
    each PE having a combiner for combining each channel response with each midamble bit and an accumulator for accumulating the output of each combiner; adder/subtractors each respectively adding or subtracting an associated channel response from a given value provided to said adder/subtractor responsive to a binary state of a midamble bit coupled to the PE; a multiplex for selectively coupling an output of each adder/subtractor to an associated accumulator; multiplexers each selectively feeding a content of an associated accumulator to provide said given value to an associated adder/subtractor; and a circuit for respectively removing each value in said accumulators from said first midamble and second data field.

13. The apparatus of claim 12 further comprising a circuit for initializing said accumulators to provide an initial given value preparatory to a cancellation operation.

14. The apparatus of claim 12 wherein said channel response is comprised of real and imaginary components; and the combiner of each PE comprising first and second adder/subtractors for respectively adding or subtracting a channel response from the given value.

15. The apparatus of claim 14 wherein each first and second adder/subtractor respectively accumulate real and imaginary components.

16. The apparatus of claim 14 wherein each adder/subtractor selectively processes interference values to be respectively cancelled from the first and second data fields.

* * * * *

UNITED STATES PATENT AND TRADEMARK OFFICE
CERTIFICATE OF CORRECTION

PATENT NO.       : 7,428,278 B2
APPLICATION NO.  : 10/335359
DATED            : September 23, 2008
INVENTOR(S)      : Buchert et al.

It is certified that error appears in the above-identified patent and that said Letters Patent is hereby corrected as shown below:

ON THE TITLE PAGE

At Item (56), U.S. PATENT DOCUMENTS, page 2, right column, delete line 1, and insert therefore --2002/0181557 A1 12/2002 Fujii--.

At Item (57), ABSTRACT, page 1, right column, line 9, before the word "removed" delete "is" and insert therefore --are--.

At column 4, delete "Equation (1)" and insert therefore

-- $\overline{M}^{mid} = \sum_{k=1}^{Km} \overline{m}^k \otimes \overline{h}^k$ taking the first W-1 samples $= \sum_{k=1}^{K_m} \sum_{i=0}^{W-2} m_i^k \cdot h_{n-i}^k$   for n=0, 1, 2 ... w-2--.

At column 5, delete line 5, and insert therefore

-- $\overline{m}^k = [m_0^k m_1^k \ldots m_{L-1}^k]$. --.

At column 9, line 40, before the word "controls" delete "128" and insert therefore --128--.

At column 9, line 48, after the word "values" delete "Real" and insert therefore --REAL--.

At column 10, line 35, before "L-(W-l)" delete "W-2and" and insert therefore --W-2 and--.

UNITED STATES PATENT AND TRADEMARK OFFICE
CERTIFICATE OF CORRECTION

PATENT NO. : 7,428,278 B2
APPLICATION NO. : 10/335359
DATED : September 23, 2008
INVENTOR(S) : Buchert et al.

It is certified that error appears in the above-identified patent and that said Letters Patent is hereby corrected as shown below:

At column 11, line 61, after the word "processing" insert --. During--.

At claim 10, column 14, line 51, after the word "when" delete "a".

Signed and Sealed this

Fourteenth Day of April, 2009

JOHN DOLL
*Acting Director of the United States Patent and Trademark Office*